United States Patent
Smith et al.

[15] 3,696,638
[45] Oct. 10, 1972

[54] CONSTANT VELOCITY UNIVERSAL JOINTS

[72] Inventors: Henry Thomas Smith, nr. Lichfield; Thomas Hughes Millward, Sutton, Coldfield, both of England

[73] Assignee: G.K.N. Birfield Transmissions Limited, Birmingham, England

[22] Filed: Sept. 9, 1970

[21] Appl. No.: 70,868

[30] Foreign Application Priority Data

Sept. 9, 1969 Great Britain..........44,513/69

[52] U.S. Cl....................................................64/21
[51] Int. Cl..............................................F16d 3/30
[58] Field of Search....................................64/17, 21

[56] References Cited

UNITED STATES PATENTS 3,400,557  9/1968  Westercamp..................64/21
3,520,152  7/1970  Schmid..........................64/21

Primary Examiner—Edward G. Favors
Attorney—Spencer & Kaye

[57] ABSTRACT

A constant velocity universal joint including an inner member and an outer member with torque-transmitting balls therebetween has the outer member thereof constituted by an increased wall-thickness end portion of a tube, the end portion being shaped to provide the ball tracks.

4 Claims, 2 Drawing Figures

PATENTED OCT 10 1972          3,696,638

CONSTANT VELOCITY UNIVERSAL JOINTS

BACKGROUND OF THE INVENTION

1. Field of the Invention

This invention relates to constant velocity universal joints of the kind including an inner member adapted to be connected to either a driving shaft or a driven shaft, an outer member surrounding the inner member and adapted to be connected to either a driven shaft or a driving shaft, registering tracks formed respectively externally on the inner member and internally on the outer member, each pair of registering tracks being adapted to receive a torque-transmitting element, normally a ball, and means being provided for assisting in positioning the torque-transmitting elements in the bisector plane of the joint when relative angular displacement occurs between the inner and outer members.

2. Description of The Prior Art

U.S. Pat. No. 2,352,776 discloses a constant velocity universal joint of the kind referred to above in which the outer member is in the form of a stamped sheet metal shell having tracks the inner surfaces of which are finished by a coining operation. The outer member includes a cylindrical part and a hub portion having a flange to which the cylindrical part is secured by a series of screws, the hub portion then being connected to a drive shaft.

U.S. Pat. No. 3,016,721 discloses a constant velocity universal joint including a pair of outer members connected by a cylindrical spacer and a pair of inner members, one associated with each outer member and with a ball and socket connection between the two inner members The two outer members are formed with tracks which receive trunnion blocks on arms of the inner members and the outer members are secured within the end portions of the interconnecting cylindrical spacer.

It is an object of the present invention to provide an improved construction of constant velocity universal joint of the kind referred to above and which will be commercially viable for a wider range of transmission drive applications than heretofore.

SUMMARY OF THE INVENTION

The outer member of a constant velocity universal joint of the kind referred to above is integral with its associated drive member and the outer member and drive member are constituted by a metal element of tubular section comprising a main body portion and an end portion having a greater wall thickness than said end portion, said greater wall thickness end portion being "formed" to define the torque-transmitting-element-receiving tracks. By the expression "formed" as used herein is to be understood the treatment of the metal of said element by way of a pressing, extruding, swaging or other operation which shapes the metal but which does not involve the removal of any metal as by a cutting, grinding or like operation.

DESCRIPTION OF THE PREFERRED EMBODIMENTS

Figure 1:
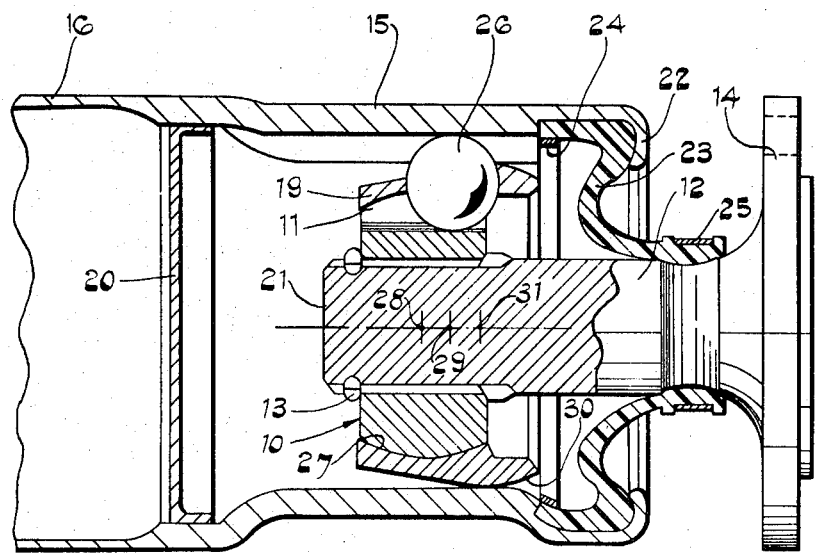
FIG. 1 is a sectional view of one form of constant velocity universal joint which provides for relative axial as well as for relative angular movement between the inner and outer members thereof.

Constant velocity universal joints have heretofore had a principal application in connection with front wheel drive motor vehicles and such joints are relatively expensive, for it has been the practise to form the tracks in both the outer and the inner member by milling and grinding operations and this, particularly in the case of the formation of internal tracks on the outer member, is a somewhat expensive operation.

Furthermore in the case of a conventional transmission drive shaft for a rear wheel drive motor vehicle it is still the practice to use Hooke's type universal joints for, although such joints do not provide for transmission of constant velocity drive between the driving and driven shafts, this disadvantage is far outweighed by the cost factor advantage as between a Hooke's type universal joint and known forms of constant velocity universal joints.

During recent years constant velocity universal joints have been designed so as to provide for relative axial, as well as relative angular, movement between the driven and driving members of the joint, such joints being known as plunge type constant velocity joints. But for the aforementioned cost factor, such plunge type constant velocity joints could have a very wide application since their inherent axial plunge feature enables one to eliminate the conventional spline coupling which has heretofore being an essential feature of transmission drive installations not withstanding the disadvantage of high axial loads under torque inherent in such couplings.

The present invention has as its principal object the reduction in the cost of producing constant velocity universal joints and by making the joint outer member integral with end associated drive member the expense of connecting the drive member to the joint member is avoided. By making the end portion of the tubular element of greater wall thickness than the remainder of the tubular element, said end portion can be made sufficiently strong for load-carrying purposes without it being necessary for the whole of the element to be of this wall thickness, thus reducing the cost of the tubular element. By "forming" the tracks as opposed to producing them by an operation involving removal of metal, the cost of the joint is still further reduced.

As shown in the drawing the joint includes an inner member 10 which is provided with longitudinally straight ball-receiving tracks 11, the inner member 10 being splined on to a shaft 12 and retained thereon by a circlet 13 or like securing ring, the shaft 12 having a flange 14 whereby it can be connected to, say, an output member from the gear box of a vehicle.

The outer member 15 of the joint is integral with its associated drive shaft, namely the tubular propeller shaft 16. The propeller shaft and outer member are formed from a tubular section element which is upset or butted so as to increase the wall thickness of the end portion thereof. After the upsetting operation, the thickened portion of the shaft is subjected to a suitable "forming" operation so as to form six longitudinally straight ball-receiving tracks as indicated by 17 in FIG.

2, the "forming" operation being such that the internal surfaces 18 between adjacent tracks 17 are all part of a common cylindrical surface so as to provide a cylindrical bearing surface for the outer face of a ball retaining cage 19.

Prior to the "forming" operation a closure plate 20 is inserted in the end of the tube and is fixed in position so as to provide means closing the inner end of the bore of the outer member 15.

Although not illustrated in the drawing it is envisaged that the closure plate 20 may have a central domed portion which projects towards the shaft 12 to limit axial movement of the inner member toward the base of the insert by engagement with the end face 21 of the shaft 12.

Conveniently at the same or, preferably, a subsequent "forming" operation the end of the end portion of the shaft 16 is plunged inwardly as shown at 22 so as to form a support for the one end of a somewhat Z-shaped seal or gaiter 23, the one end thereof being retained in engagement with the plunged end 22 of the shaft 16 by means of an internal clip or ring 24 and the other end being retained on the shaft 12 which carries the inner member 10 by means of an externally mounted ring or clip 25.

As can be seen from FIG. 1 the gaiter 23 is arranged so that said one end thereof provides an end stop preventing movement of the balls 20 out of the tracks 17 in the direction towards said plunged end 22.

As will be observed from reference to FIG. 1, the ball carrying cage 19 is such that the inner surface 27 thereof is of part-spherical form being struck about a center 28 which is center to one side of the joint center 29, whilst the outer surface of the cage includes a part-spherical portion 30 struck about a center 31 which is off-set by an equal amount to the other side of the joint center 29.

Such an arrangement, which is fully described and claimed in British Patent No. 1,072,144 ensures that, whilst there is freedom for relative axial movement between the inner and outer members 10 and 15 of the joint, the mating surfaces between the cage 19 and the inner member 10 and the cage 19 and the outer member 15 serve to assist in positioning the torque-transmitting balls 20 in the bisector plane of the joint, which positioning is of course a criterion for constant velocity operation.

Figure 2:
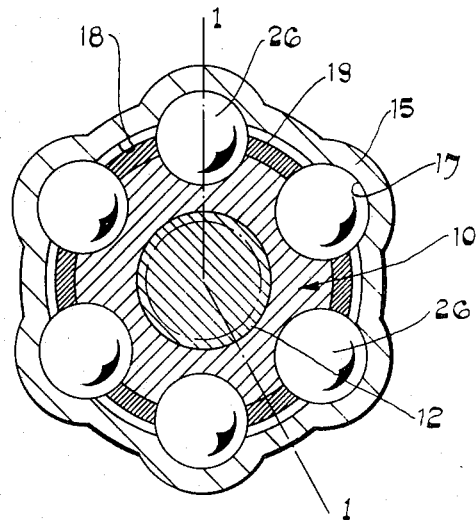
FIG. 2 is a section taken transversely to FIG. 1, the section of FIG. 1 being taken along the line 1—1 of FIG. 2.

In "forming" the tracks 17 in the outer member 15, a one-part or multi-part mandrel having the required external contour will be positioned within the upset increased wall thickness portion of the tubular element and the increased wall thickness portion will then be deformed inwardly so as to adopt the cross-sectional configuration shown in FIG. 2. The provision of tracks 17 which are longitudinally straight facilitates removal of the mandrel subsequent to said inward deformation process. In an alternative arrangement, the upset increased wall thickness portion is positioned within a die having the required internal contour and then said portion expanded electrohydraulically to the required cross-section.

The wall thickness of the tubular element from which the outer member 15 and propeller shaft 16 are made will normally lie originally within the range of from 2 to 16 percent of the tube diameter, depending on the diameter and on the intended use of the joint. The upsetting operation will normally be such that the increased wall thickness portion is approximately twice the wall thickness of the remainder of the tubular element.

It will normally be necessary for the tracks 17 which have been provided in the outer member 15 by the "forming" operation to be induction hardened.

Such a construction as described above would enable the outer member of a joint and its associated propeller shaft to be formed very much more cheaply than heretofore and thus offers the possibility of a transmission drive unit with a plunge type C.V. joint at either one or both ends thereof forming a viable commercial alternative to the present arrangement wherein a Hooke's Joint is provided at each end of the propeller shaft and there is an intermediate spline coupling.

Equally the invention can be applied to the formation of the outer member of a constant velocity joint which is not of the plunge type.

Furthermore, although the invention has been described in relation to its primary application in the vehicle transmission field it is capable of a wide application in the industrial field.

We claim:

1. In a constant velocity universal joint of the kind including an inner member adapted to be connected to a drive shaft, an outer member surrounding the inner member, registering tracks formed respectively externally on the inner member and internally on the outer member, a torque-transmitting element received in each pair of registering tracks and means provided for assisting in positioning the torque-transmitting elements in the bisector plane of the joint when relative angular displacement occurs between the inner and outer members, the improvement wherein the outer member of the joint is integral with its associated drive shaft and the outer member and drive shaft are constituted by a metal element of tubular section comprising a main body portion and an end portion having a greater wall thickness than said body portion, said greater wall thickness end portion being "formed" to define the torque-transmitting-element-receiving tracks.

2. A joint according to claim 1 wherein the tracks in both the inner and outer members of the joint are longitudinally straight tracks and the joint is a plunging constant velocity universal joint.

3. A joint according to claim 1 wherein a closure plate is fitted within said tubular section element adjacent the junction between the main body portion and the increased wall thickness end portion.

4. A joint according to claim 1 wherein a flexible seal of gaiter-like form extends between the outer member and the shaft upon which the inner member of the joint is carried and wherein said flexible seal is arranged to limit relative axial movement between the inner and outer members in one direction.

* * * * *